ELECTRICAL COMMUNICATION SYSTEMS

Filed March 24, 1953 4 Sheets-Sheet 1

INVENTOR
Abraham Gilmoor
By Watson, Cole, Grindle & Watson
ATTORNEYS

Aug. 26, 1958 A. GILMOOR 2,849,702

ELECTRICAL COMMUNICATION SYSTEMS

Filed March 24, 1953 4 Sheets-Sheet 2

INVENTOR
Abraham Gilmoor
By Watson, Cole, Grindle & Watson
ATTORNEYS

Aug. 26, 1958 A. GILMOOR 2,849,702

ELECTRICAL COMMUNICATION SYSTEMS

Filed March 24, 1953 4 Sheets-Sheet 3

INVENTOR
Abraham Gilmoor
By Watson, Cole, Grindle & Watson
ATTORNEYS

INVENTOR
Abraham Gilmoor
By Watson, Cole, Grindle & Watson
ATTORNEYS

United States Patent Office 2,849,702

Patented Aug. 26, 1958

2,849,702

ELECTRICAL COMMUNICATION SYSTEMS

Abraham Gilmoor, Rickmansworth, England

Application March 24, 1953, Serial No. 344,300

Claims priority, application Great Britain March 6, 1953

25 Claims. (Cl. 340—157)

The invention relates to electrical communication systems (such, for example, as telemetering systems, telephone systems and remote control systems) in which electrical signals are passed along a communication channel extending from one station to another.

It is an object of the invention to provide an improved electrical communication system.

The invention provides in one of its aspects an electrical communication system comprising a plurality of line relays associated respectively with a plurality of communication channels extending therefrom to remote stations, each of said line relays being adapted for operation to complete a communication channel between the associated remote station and a supervisory station, a selector operable to select for operation any one of the line relays, a dial for operating the selector, means for energising the selected line relay through the selector, and means for maintaining the selected line relay in operated condition independently of the selector.

Preferably the system comprises means for returning the selector to a home condition, in which it is ready for operation again, substantially immediately after the selected line relay has been operated. The system may have a plurality of supervisory stations each having a dial as aforesaid, whereby the selector may be operated by the dial associated with any supervisory station as soon as it has returned to its home condition and while one or more communication channels are completed each between a remote station and another supervisory station.

The invention provides in another of its aspects an electrical communication system comprising a signalling instrument including a dial which includes auxiliary contacts arranged and connected so as to be operated, on initial movement of a part of the dial which moves during each dialling operation, to connect the instrument operatively to a communication channel.

Preferably the dial is of the kind comprising a rotatable finger-plate, a series of finger holds (e. g. apertures) on the finger plate around the axis thereof whereby the finger-plate may be manually rotated by a finger engaging with any selected one of the finger-holds, a finger-stop in the path of such a finger to stop further rotation of the finger-plate by engagement with the finger after the finger-plate has been rotated in a forward direction by an amount predetermined by the finger-hold selected, means resiliently urging the finger-plate to return to a home position relative to the finger-stop by rotation in the reverse direction as soon as the finger is dis-engaged from the finger-hold, governor means for controlling the return movement of the finger-plate so that it takes place at a predetermined rate, and means rotatable with the finger-plate for interrupting a circuit, during the return movement of the finger-plate, a number of times dependent on the finger-hold selected, whereby the dial may be employed to operate a selector to select one of a plurality of contacts thereon in accordance with the finger-hold selected.

The said channel may include a maintaining relay operable to maintain the instrument connected to the channel, which maintaining relay is arranged to become operated on connection of the instrument to the channel as aforesaid. The said auxiliary contacts may be arranged and connected so that when the finger-plate, or other movable parts of the dial, returns to its home position after completion of a dialling operation the said auxiliary contacts complete a holding circuit to maintain the maintaining relay in operated condition. The auxiliary contacts are preferably further arranged and connected so that on the initial movement of the finger-plate, or other movable part of the dial, as aforesaid, the holding circuit is broken momentarily thereby causing the maintaining relay to become unoperated, if it is in operated condition. The auxiliary contacts may be arranged and connected so that on further forward movement of the finger-plate, or other movable part of the dial, the maintaining relay is operated again as aforesaid. Preferably the operation of the maintaining relay is effected by means comprising one or more slow-releasing auxiliary relays to ensure or to assist in ensuring that the maintaining relay does not become unoperated before the holding circuit is completed. Alternatively, or in addition, one or more auxiliary holding relays may be provided to ensure, or to assist in ensuring, that the maintaining relay does not become unoperated before the holding circuit is completed.

The maintaining relay may constitute or control the said means for maintaining the selected line relay in operated condition independently of the selector, so that the selected line relay is maintained in operated condition when the maintaining relay is in operated condition.

A specific electrical communication system embodying the invention will now be described by way of example and with reference to the accompanying drawings, in which.

Figure 1:
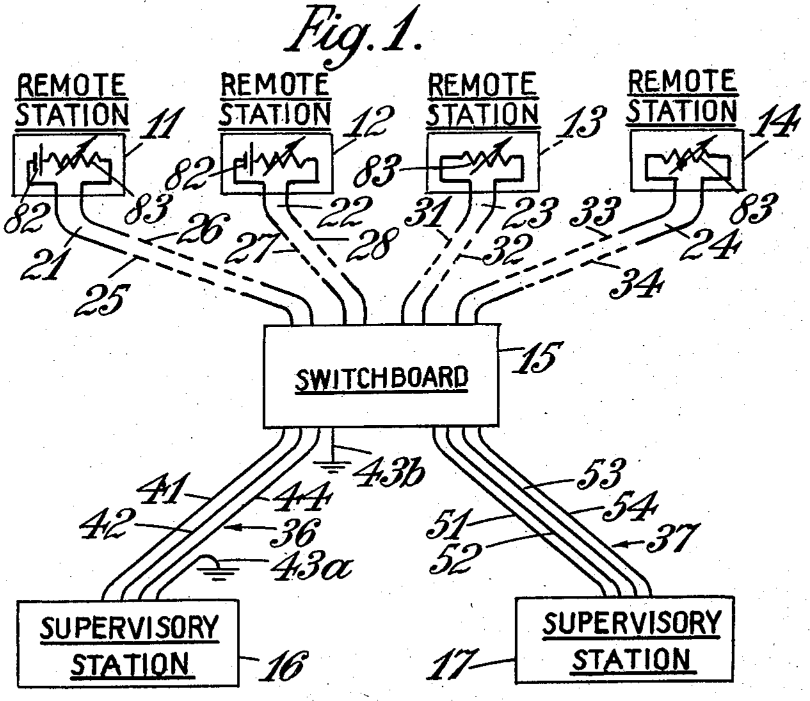
Figure 1 is a schematic diagram of the system of this particular example.

In this example the system comprises four remote stations, 11, 12, 13, 14, a switchboard 15 and two supervisory stations 16, 17. The remote stations are connected to the switchboard by communication channels 21, 22, 23, 24 comprising electrically conducting pairs of lines 25, 26; 27, 28; 31, 32; and 33, 34. The supervisory stations are connected to the switchboard by communication channels 36, 37. The channels 36 comprises three electrically conducting lines 41, 42 and 44 and earth connections **43*a* and 43*b*. The channel 37 comprises four electrically conducting lines 51, 52, 53, 34**.

The switchboard 15 has a 50 volt supply battery 38, having a negative terminal 39 and a positive terminal 45. For clarity of drawing, the various connections to the battery are indicated by lines terminating in arrow heads and marked with a "—" sign, to indicate a connection to the negative terminal 39 and with a "+" sign to indicate a connection to the positive terminal 45 of the battery.

The switchboard 15 comprises a rotary selector 40 of the kind known as a two-bank unit selector, having 11 contacts in each bank, and a number of electromagnetically operable relays. In the accompanying drawings each relay is shown, in accordance with the well-known convention, as a rectangle (representing the operating coil and having a reference letter or letters or a combination of letters and numerals) and associated sets of spring contacts which are shown in the positions which they assume when the relay is in its unoperated condition, i. e.

with its coil unenergized. Each set of contacts is marked on the drawings with a reference number and is referred to herein by the reference of the relay followed by a hyphen and the reference number of particular contact set of that relay, e. g. the contact set 6 of relay DX2A is referred to herein as contacts DX2A–6.

Associated respectively with the channels 21, 22, 23, 24, to the remote stations are four line relays LR1, LR2, LR3, and LR4. Associated with the supervisory station 16 in the switchboard are a maintaining relay KRA, and relays DX1A, DX2A, TD1A, TD2A, LA, MA and XA. Associated with the supervisory station 17 in the switchboard are a maintaining relay KRB, and relays DX1B, DX2B, TD1B, TD2B, LB, MB and XB. The switchboard also comprises relays A, B, DR, DH, Z, X, and LT.

The unit selector 40 comprises a driving coil DM: self-drive contacts MS; a bank 59 having contacts 60, 61, . . . 69, 70 and a wiper 58; and a bank 79 having a "home" contact 80, ten contacts 81 connected together and a wiper 78.

In this example the remote stations 11 and 12 each comprise a battery 82 and a variable resistance element 83, and the remote stations 13 and 14 each comprise a variable resistance element 83, but no battery 82. The variable resistance elements 83 may be arranged in any well-known manner to be responsive to any condition at a remote station and to have a resistance setting in accordance with that condition, e. g. the degree of fullness of a tank containing liquid. The battery 38 is connected at 84, 85 in series with the lines 31 and 33 of the channels 23 and 24 which extend to the two remote stations 13, 14, which have no battery 82.

Each supervisory station comprises an instrument comprising an automatic-telephone-type dial 86, an ammeter constituting a control-indicator 87, a volt-meter constituting a position-check indicator 88, an indicator lamp 89 and a control relay N having a low resistance coil.

Figures 4, 5, 6:
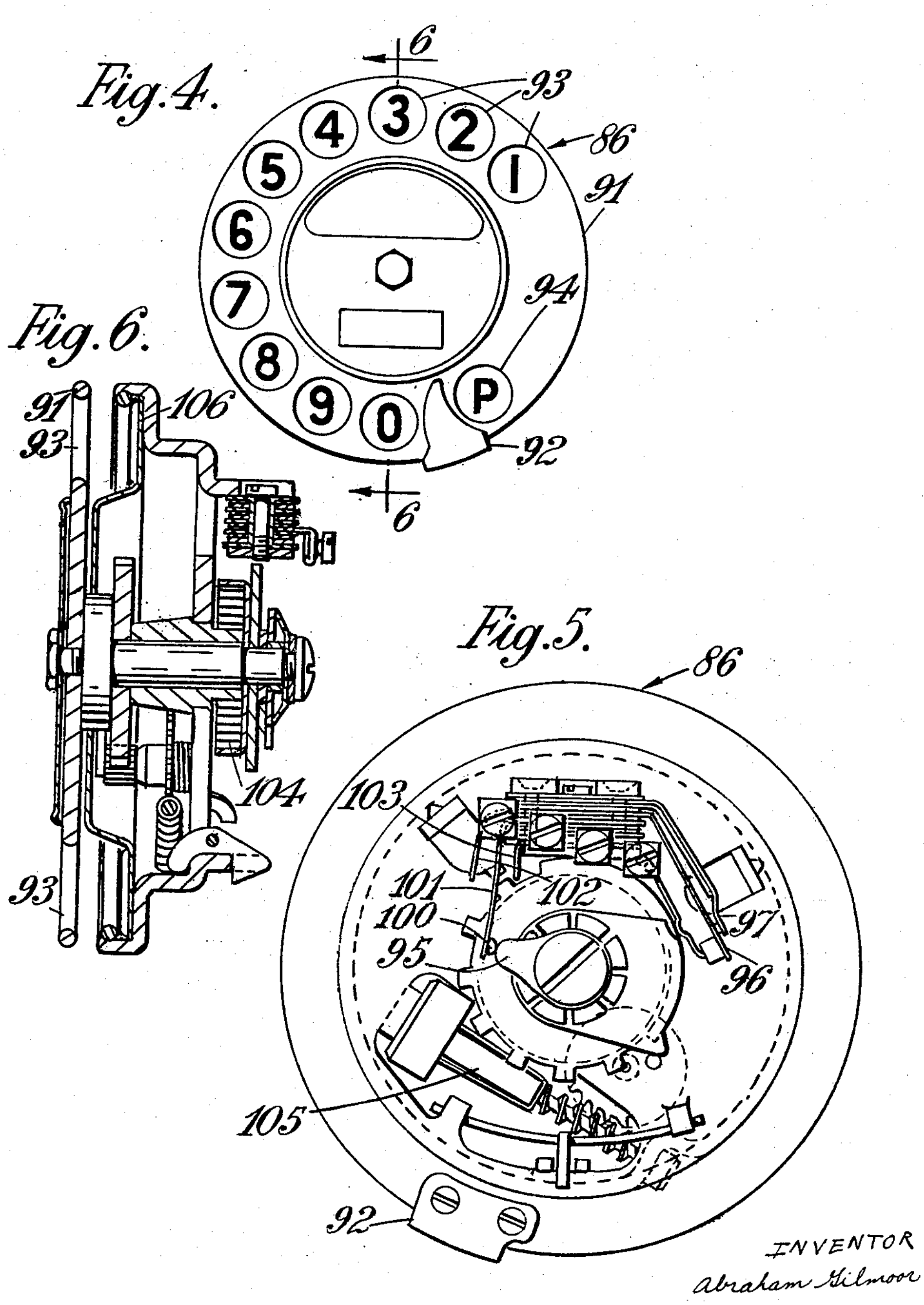
Figure 4 is front view of the dial employed at a supervisory station.
Figure 5 is a rear view of the dial to an enlarged scale.
Figure 6 is a sectional view of the dial also to an enlarged scale, on the line 6—6 in Figure 4.

The dial 86 comprises a rotatable finger-plate 91, a finger-stop 92, eleven finger-holds 93, 94 on the finger-plate provided as apertures therein, a cam 95 rotatable with the finger-plate, impulse contacts 96, 97, operated in well-known manner, and auxiliary contacts 101, 102, 103 operated by the cam 95. The central contact 101 is spring biassed so that it tends to move into contact with contact 103, but when the finger-plate is in its "home" position the cam 95 engages in tip-to-tip contact with a rounded projection 100 on the contact 102 and thereby presses contact 101 into contact with contact 102 and holds it away from contact 103, as shown in Figure 5. The finger-plate is urged towards its "home" position (which it normally occupies as shown in Figures 4, 5 and 6) by a driving spring 104 and its speed of rotation in returning to that position is governed by a governor 105, in well-known manner. That speed is less than in the standard dial. This dial is of well-known construction except for the contacts 101, 102, 103 and cam 95 and the provision of the finger-hold 94 which has a letter P marked on the number plate 106 behind it, the other finger-holds 93 having numerals 1–9, 0 marked on the finger-plate behind them in well-known manner. The P finger-hold 94 is positioned on the finger-plate so that if "P" is dialled in the normal manner instead of dialling a number, the cam 95 moves relative to the projection 100 just sufficiently for the contact 101 to break contact with the contact 102 but not sufficiently for the contact 101 to make contact with the contact 103. On release of the finger-plate the cam 95 pushes contact 101 into contact with contact 102 again. The impulse contacts remain closed when P is dialled. On dialling a number by means of the finger-plate the cam 95 moves right away from the projection 100 and the contact 101 makes contact with contact 103 after breaking contact with contact 102, and does not change back to contact with contact 102 instead of 103 until the finger-plate returns to rest after the dialling operation.

The manner of operation of the system will be apparent from the following description. Assume that it is desired to record on the control indicator meter at supervisory station 16 an indication of the setting of the variable resistance at remote station 11. A finger is inserted into the finger hold corresponding to the number "1" of the dial at supervisory station 16, and the finger-plate of that dial is thereby rotated until the finger engages against the finger-stop, whereupon the finger-plate is released to return to its home position. During the initial part of the forward movement of the finger-plate the contact 101 loses contact with contact 102 and makes contact with contact 103, as aforesaid. The line 41 is thereby connected to the positive terminal of the battery 38 through earth connections **43*a*, 43*b* and the impulse contact 96, 97. The coil of relay DR is thereby energised by way of line 41, the coil of relay XA, closed contacts DX1A–1, contacts XA–2, closed contacts X–4, and closed contacts DR–3. The relay XA is also operated at the same time. On operation of relay DR the contacts DR–1 close and energise the coil of relay Z. The contacts DR–2 also close and cause energisation of the unit-selector driving coil DM by way of closed contacts A–1. The contacts DR–2 are shunted by a spark-quench circuit comprising a resistor 111 and a capacitor 112. The contacts DR–3 open and break the circuit which energised the coil of relay DR. However, on operation of relay XA the centre contact of the contacts XA–2 (which are make-before-break contacts) changed over, thereby completing a holding circuit for the coil of relay DR through the line 41**, the coil of relay XA, contacts DX1A–1, and contacts XA–2. The contacts XA–1 close, thereby preparing an energising circuit for the coil of relay KRA. The contacts DR–4 close, for the purpose later described. The contacts DR–4 in fact close before the contacts DR–1 and DR–2 close and contacts DR–3 open.

On operation of relay Z the contact Z–1 close and cause energisation of the coil of relay X. On operation of relay X the pairs of contacts X–1, X–2 and X–5 close and the pairs of contacts X–3 and X–4 open. The closing of the contacts X–1 energises the coil of relay KRA by way of closed contacts XA–1. The closing of contacts X–5 energises the coils of relays LA and LB. On operation of relay LA the contacts LA–1 open and so open the circuit of the coil of relay TD2A to prevent any energisation of the coil of relay TD2A.

On operation of relay KRA the pairs of contacts KRA–1, KRA–2 and KRA–3 close. The closing of contacts KRA–2 and KRA–3 causes energisation of the coil of relay B by way of contacts DX2A–10. The closing of contacts KRA–1 cause energisation through closed contacts DX2A–9, of the coil of relay TD1A. Relay TD1A is a slow-operating relay and accordingly there is a time delay before relay TD1A operates.

On operation of relay B the pairs of contacts B–1 and B–2 close. The closing of contacts B–2 connects wiper 58 of the unit selector to the positive terminal of the battery by way of contacts A–2 and X–2 and the coil of a relay LT which has a coil of low resistance and is a high speed relay.

During the return movement of the finger-plate the impulse contacts 96, 97 open momentarily once (as the number "1" was dialled). The relay DR becomes unoperated momentarily during the momentary opening of the impulse contacts, and owing to the consequent momentary opening of the contacts DR–2 the driving coil DM of the unit selector becomes momentarily de-energised. The wipers 58, 78 of the unit selector therefore step forward one position so that wiper 58 rests on contacts 61 of the bank 59 and the wiper 78 rests on the corresponding contact 81 of the bank 79. The coil of the line relay LR1 consequently becomes energised by way of the wiper 58 and the contact 61 providing that the coil of line relay LR1 is not already energised.

Relays Z and X are slow-releasing relays so that they do not become unoperated during the momentary de-energisation of the coil of relay Z due to momentary opening of the contacts DR–1. Even in the event of the relay Z becoming unoperated momentarily, the relay X does not become unoperated. The delay time of relay X is twice that of relay Z.

On operation of the line relay LR1 the pairs of contacts LR1–1, LR1–2, LR1–3, LR1–4, LR1–5 and LR1–6 close.

Meanwhile relay TD1A has operated, thereby closing the pairs of contacts TD1A–1 and TD1A–2. The closing of contacts TD1A–2 causes energisation of the coils of relays DX1A and MA, while the closing the contacts TD1A–1 completes the energisation circuit of the coil of relay TD2A except for the contacts LA–1 which are open. On operation of relay MA the contacts MA–1 close and complete a safeguarding holding circuit for the coil of relay KRA, by way of contacts DX2A–7.

On the operation of relay DX1A the pairs of contacts DX1A–1 open and the contacts DX1A–2 close. The opening of contacts DX1A–1 breaks the holding circuit of the coil of relay DR and consequently relay DR becomes unoperated. The pairs of contacts DR–1 and DR–2 thereupon open, thereby de-energising the driving coil DM of the unit selector and the coil of the relay Z. After a delay relay Z becomes unoperated and its contacts Z1 open to de-energise relay X. After a delay X becomes unoperated thereby opening the pairs of contacts X–1 and X–2 and X–5, and closing the pairs of contacts X–3 and X–4. The opening of contacts X–2 breaks the connection between the wiper 58 and the positive terminal of the battery 38. The opening of contacts X–5 de-energises relay LA which becomes unoperated and contacts LA–1 close. The coil of relay TD2A is thereby energised, but relay TD2A is a slow operating relay and there is a time delay before it operates.

On operation of relay TD2A the contacts TD2A–1 close and cause energisation of the coil of relay DX2A by way of closed contacts TD1A.

On operation of relay DX2A the pairs of contacts DX2A–1, DX2A–2, DX2A–6, DX2A–7, DX2A–9 and DX2A–11 open, the pairs of contacts DX2A–3, DX2A–4 and DX2A–5 close, the normally open three contacts DX2A–8 all make contact with one another and the centre contact of the change-over contacts DX2A–10 changes over. The contacts DX2A–10 are of the make-before-break type. The change-over of the contacts DX2A–10 breaks the energisation circuit of relay B and completes a holding circuit for relay LR1 by way of closed contacts LR1–1, closed contacts DX2A–10 and closed contacts KRA–2. The contacts DX2A–8 close before contacts DX2A–9 open.

The closing of contacts LR1–6 energised the coil of relay A by way of contacts LR1–1, DX2A–11 and B–1. On operation of relay A contacts A–1 opened and the centre contact of the change-over contacts A–2 changed over. The opening of contacts A–1 opened the impulse driving circuit of the driving coil DM of the unit selector while the change over of the contacts A–2 energised the driving coil DM through the unit selector self-drive contacts MS by way of contacts B–2, X–3, wiper 78 and contact 81 of the bank 79, as soon as X became unoperated. The unit selector wipers thereupon returned to their home position. On relay B becoming unoperated, relay A becomes de-energised and unoperated, thereby closing contacts A–1 and changing back contacts A–2 to de-energise the wiper 78 and prepare the unit selector for immediate operation by any other supervisory station.

Meanwhile the finger plate has returned to its home position thereby causing contact between contacts 101 and 102 instead of between 101 and 103 and so connecting the line 42 instead of the line 41 to the earth connection 43*a*. A holding circuit is thereby provided for relay KRA by way of closed contacts DX2A–3, earth connections 43*b* and 43*a*, contacts 101 and 102, line 42, closed contacts DX2A–5 and closed contacts KRA–1 before the opening of contacts X–1 breaks the original energising circuit of relay KRA. The opening of contacts DX2A–9 breaks the energising circuit of relay TD1A which becomes unoperated and opens contacts TD1A–1 and TD1A–2. The opening of contacts TD1A–2 opens the energising circuit of relays MA and DX1A which passes though those contacts. However relays MA and DX1A remain energised through closed contacts DX2A–8 and closed contacts KRA–1 which thereby provide a holding circuit. The opening of contacts TD1A–1 opens the energising circuits of relays DX2A and TD2A. Relay TD2A becomes de-energised unoperated, but relay DX2A remains energised and operated by reason of the holding circuit provided through closed contacts DX2A–8 and KRA–1. The holding current flowing through the line 42 energises a relay N having low resistance operating coil, at the supervisory station 16 and causes contacts N–1 to change-over.

The line 25 from the remote station 11 is now connected to the control indicator meter 87 by way of closed contacts LR1–3, closed contacts DX2A–4, line 44 and changed-over contacts N–1. The line 26 from the remote station 11 is now connected to the other pole of the control indicator meter 87 by way of closed contacts LR1–5, DX1A–2 and line 41. The control indicator meter 87 thus gives the required reading.

It will be appreciated that the circuit between the remote station and the meter 87 is maintained by the relays LR1, DX1A and DX2A being in the operated condition, that those three relays are held in operated condition by holding circuits as aforesaid which are completed through the self-holding contacts KRA–1 of the operated relay KRA. The holding circuit for relay KRA is completed by the contact 101, 102 of the dial.

The operation of the circuit of the position check indicator meter 88 will now be explained. Associated with each line relay, LR1, LR2, LR3, LR4, there are respectively voltage dropping resistors R1, R2, R3, R4, of mutually different resistance values. After the selected line relay, LR1 in the present instance, has operated and before the relay DX2A operates the resistor R1 is connected in series with the position check indicator 88 across the battery 38 by way of closed contacts LR1–2, closed contacts DX2A–6, closed contacts DX2A–2, line 44, contacts N–1 (before they have changed over), and earth connections 43*a*, 43*b*. The reading on the meter 88 corresponding to the value of the resistance R1 is marked on the meter 88 with a symbol representing remote station 11. The readings of the meter 88 corresponding to the values of the resistors R2, R3, R4, are similarly marked with symbols representing the other remote stations. Consequently after a number has been dialled an indication of the remote station with which communication has been established appears on the meter 88 for a short period, enabling the correctness of the selection effected at the switchboard to be checked.

When the reading has been taken at the supervisory station 16, either the number of another remote station or "P" is dialled. In either case the contacts 101, 102 will open and so break the aforesaid holding circuit. Relays KRA, DX1A, DX2A and LR1 will thus become de-energised and unoperated, thus breaking the connections between the remote station 11 and the supervisory station 16. If the number of another remote station is dialled the switch board operates in a manner exactly analogous to that described above to connect the lines from the said other remote station to the indicator 87 at the supervisory station 16.

In this particular example either of remote stations 11 and 12 can be dialled from supervisory station 16 and either of remote stations 13 and 14 can be dialled from supervisory station 17. Supervisory station 16 thus can only take readings from remote station 11 or 12, and supervisory station 17 can only take readings from remote station 13 or 14. Supervisory station 16 may for example be controlled by an engineer responsible for stations 11 and 12, and supervisory station 17 may be controlled by an engineer responsible for stations 13 and 14. However it will be appreciated that both supervisory stations make use of the same selector 40 and its associated relays DR, A, B, Z, X, LT and DH.

It will be seen that while relay DR and/or relay X is operated as aforesaid during the dialling operation from supervisory station 16 the contacts DR–3 and/or contacts X–4 are open and that consequently while relay DR and/or relay X is operated the coil of relay XB cannot be operated by any dialling operation from supervisory station 17. Further, as contacts XB–1 are open when relay XB is unoperated, the relay KRB cannot be energised by dialling from supervisory station 17 while the relay DR and/or relay X is operated as a result of dialling from supervisory station 16. The relay DR may be energised by supervisory station 17, in order to dial from that station, as soon as relay X has become unoperated.

When the circuit from the dial to the relay DR is uninterrupted the lamp 89 lights on forward movement of the finger-plate and so indicates that dialling may be proceeded with. However if lamp 89 does not light it indicates that the unit selector is being used by the other supervisory station.

If when the wiper 58 reaches the contact 61 the coil of the line relay LR1 is not energised, the coil of the relay LT is energised through the wiper 58, the contact 61 and the coil of the relay LR1 (as the resistance of the coil of relay LT is very much less than that of relay LR1). Relay LT operates very quickly and the normally closed contacts LT–1 open. If however, when the wiper 58 reaches the contact 61 the coil of line relay LR1 is energised, then one side of the coil of the relay LT will be connected to the positive terminal of the battery through wiper 58, contact 61 and closed contacts LR1–1, while the other side of the coil of relay LT will also be connected to the positive terminal of the battery through closed contacts X–2. In that case the coil of relay LT will not become energised and the contacts LT–1 will remain closed and will complete a circuit from the positive terminal of the battery to wiper 78 and closed contacts DR–4, except that the contacts DH–1 are open. When the contacts DH–1 close (as described hereinafter) the driving coil DM of the unit selector is energised through its self-driving contacts MS by way of the wiper 78, and contact 81, and so the wipers 78, 58 are driven to their home positions. The purpose of the relay DH is to prevent the wipers being driven home in that manner whenever the wiper 58 passes over, as opposed to stopping on, a contact in the bank 59 which is connected to an energised line relay, e. g. if "4" were dialled from one supervisory station while the relay LR1 were energised by a "call" from the other supervisory station. The relay DH is a quick operating and slow-releasing relay. One side of the coil of relay DH is connected to the positive terminal of the battery through contacts DR–4. The other side of the coil of relay DH is connected to the negative terminal of the battery through the self-driving contacts MS and the driving coil DM of the unit selector. The contacts MS open when the coil DM is energised and close when it is de-energised. When the relay DR operates as aforesaid and thereby closes first contacts DR–4 and then contacts DR–2 the coil of relay DH is momentarily energised through the contacts MS, just before the latter contacts open. Relay DH operates and remains operated and opens contacts DH–1, thereby preventing the wiper 78 from being energised by any closing of contacts LT–1 until relay DH becomes unoperated after a delay, relay DH being a slow-releasing relay. Relay DH does not become unoperated until after the wipers 58 and 78 have stopped on the contacts in the banks 59 and 79 corresponding to the number dialled. If relay LT is then in unoperated condition the wipers 58 and 78 are driven immediately to their home position, as aforesaid and consequently neither a position check indication nor a control meter indication appears at the supervisory station from which dialling was effected. The absence of any reading on the position check indicator gives an indication that the dialled number is engaged.

The relays KRB, DX1B, DX2B, LB, MB, TD1B and TD2B associated with supervisory station 17 perform functions for that supervisory station which are identical with the functions performed for the supervisory station 16 by, respectively, relays KRA, DX1A, DX2A, LA, MA, TD1A and TD2A. Additional supervisory stations may be provided together with a similar set of relays, similarly connected, as will be readily apparent to those skilled in the art. Additional remote stations may also be provided, a line relay being provided for each.

If a supervisory station dials a number of one of the remote stations which it does not control, for example if the number of remote station 13 is dialled from supervisory station 16, it will be appreciated that the line relay LR3 will be operated through wiper 58 and contact 63 but will not remain operated because relay KRB and DX2B will not be operated to close contacts KRB–2 and DX2B–10 to provide a holding circuit. The absence of a reading on the position check indicator will indicate that a wrong number was dialled. If while supervisory station 17 is connected through the switchboard to remote station 13, the number of that same remote station 13 is dialled from supervisory station 16 the unit selector wipers return to their home positions by reason of relays DH and LT as aforesaid.

The contacts LR1–4, LR2–4, LR3–4, LR4–4, which close when the corresponding line relays are operated, may be employed for any convenient purpose e. g. to complete energising circuits to light indicator lamps on a mimic diagram to indicate which line relays, if any, are in operated condition at any particular time.

The relays employed in this example are all of the type commonly employed in the automatic telephone systems of the British Post Office, except for the slow operating relays and the slow-releasing relay DH, which are of other known kinds. The unit selector is of the kind commonly employed in the British Post Office automatic telephone systems. When more than ten remote stations are provided any other convenient form of selector may be employed, e. g. a uniselector (of the kind commonly employed in the British Post Office automatic telephone systems as preselectors and having twenty-five contacts in each bank) or a two motion selector of any known kind operable by two digits dialled successively.

Figure 3:
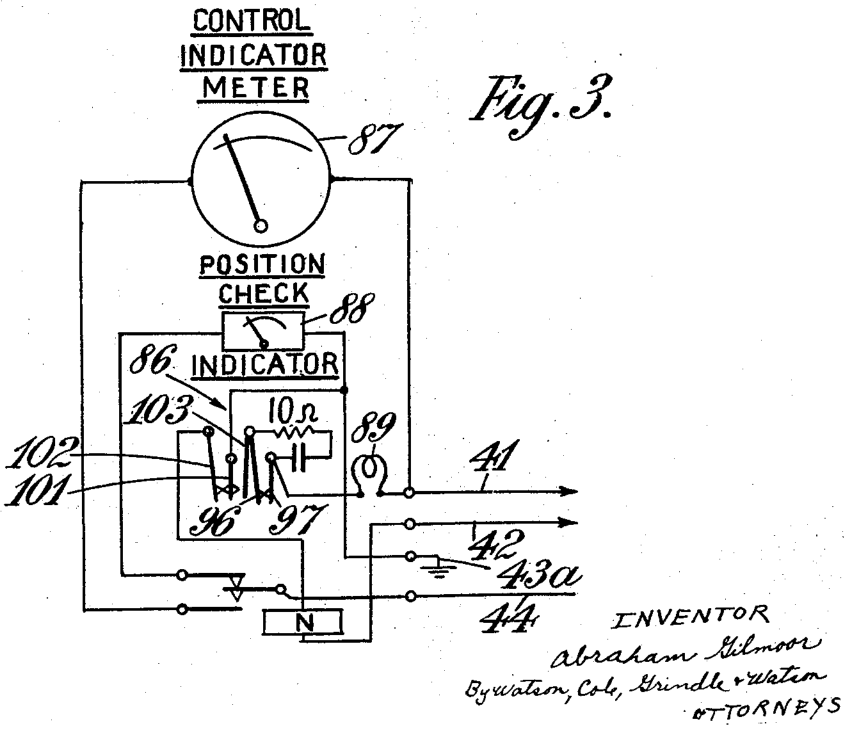
Figure 3 is a circuit diagram of a supervisory station.
Figure 2A:
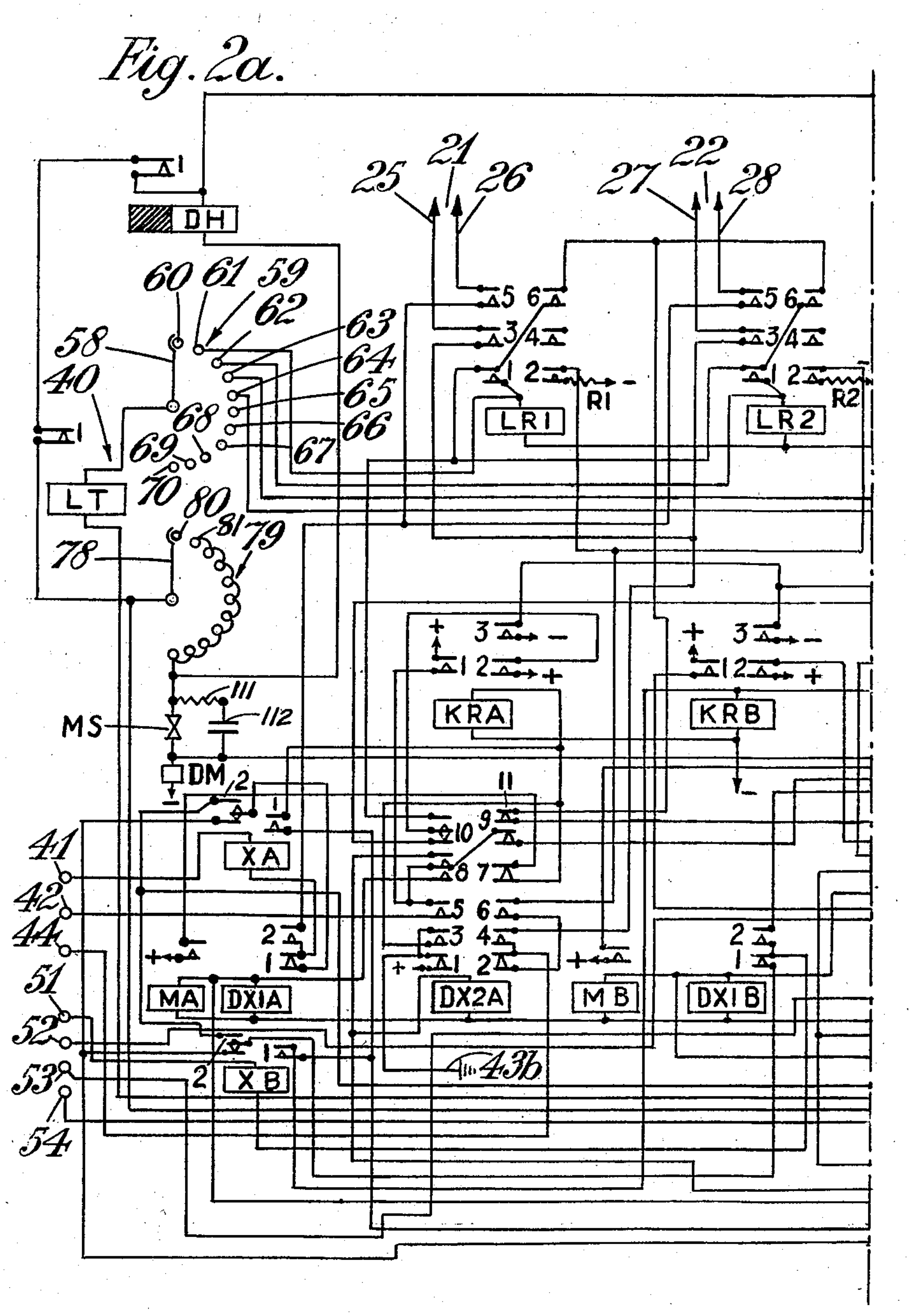
Figure 2 (in two parts 2*a* and 2*b*) is a circuit diagram of the switchboard.
Figure 2B:
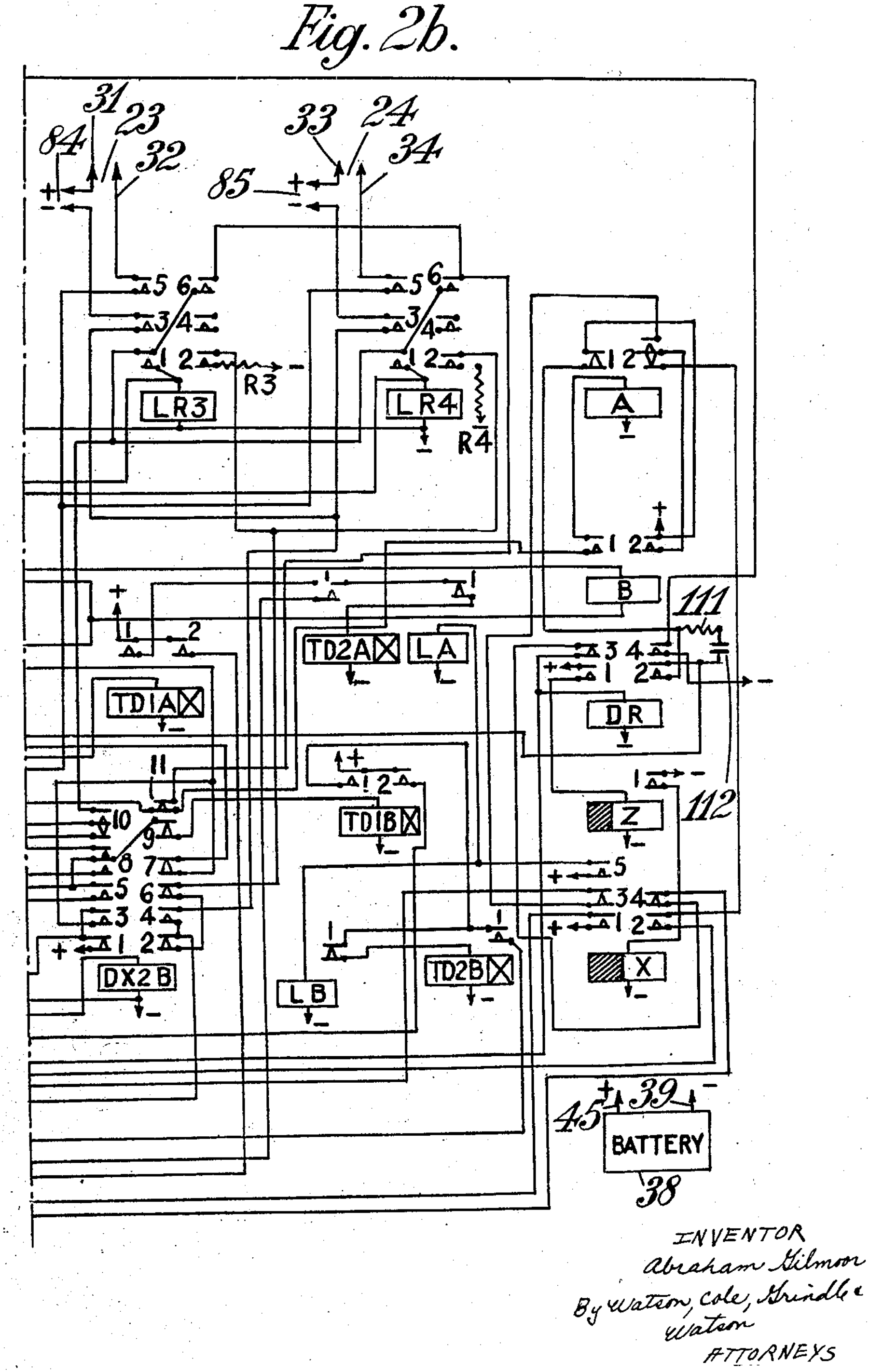

The connections between the instrument at supervisory station 17 and the lines 51, 52, 53, 54 are similar to those shown in Figure 3, these lines corresponding to lines 41, 42 earth connections 43*a*, 43*b*, and line 44 respectively.

It will be appreciated that in the case of remote stations 13 and 14 the source of the current causing the readings on meter 87 in the battery 38 at the switchboard, whereas in the case of remote stations 11 and 12 it is the batteries 82 at those remote stations. In either case the earth connections 43*a*, 43*b* (or equivalent line 53) do not form part of the circuit between the remote station and the meter 87. The line 53 may be replaced by earth connections similar to connections 43*a* and 43*b* if so desired.

The invention is not restricted to the details of the foregoing example and modifications may be made to that example without departing from the scope of the invention. For instance the ammeter 87 may be replaced by any milliammeter, millivoltmeter, potentiometer or other indicator suited to any particular outputs or signals which are received from or controlled by any apparatus installed at the remote stations.

It will be apparent to those skilled in the art that the circuit of the foregoing example may be modified to permit any supervisory station to be put into communication with any of the remote stations, instead of each supervisory station being restricted to communication with any of a particular group of remote stations.

It will be appreciated from the foregoing description that the following advantageous features may be achieved:

(1) A supervisory station can be put into telemetering or remote-control communication with a remote station by a simple dialling operation, whereby a relay is selected which has contacts for making connection to the channel from the remote station.

(2) During the dialling and selecting operation no other supervisory station can make use of the selector employed and no lamp 89 at another supervisory station can be lit.

(3) After the dialling and selecting operation another supervisory station can use the selector, which is then free.

(4) When an engaged number or an unauthorized number is dialled the selector at once returns to its home position after the dialling operation.

(5) After the dialing and selecting operation a position check indication is received, providing that an authorised and unengaged number was dialled. This serves to indicate (*a*) That no dialling error was made, (*b*) That the dialled number is not engaged, and (*c*) That an unauthorised number was not dialled.

(6) As a dialling and selecting operation takes only a very short time, one single selector is sufficient for a considerable number of supervisory stations.

(7) As no preliminary action (such as lifting a receiver from a rest) is required before dialling is carried out, dialling may be carried out without delay. This is very useful if a number of readings are to be taken from different remote stations in quick succession.

(8) If the position check indicator does not indicate the correct number after dialling, the call may be quickly cancelled by dialling "P."

I claim:

1. An electrical communication system comprising a switching station; a plurality of stations remote therefrom; a plurality of communication channels extending between the switching station and the respective remote stations; a plurality of line relays associated respectively with said communication channels, each line relay being operable to render operative the associated channel; said switching station including a selector operable to select for operation any one of said line relays; a dial having contacts operable, by dialing to operate said selector; means for energizing the selected line relay through the selector; and means for maintaining the selected line relay in operated condition independently of the selector.

2. An electrical communication system according to claim 1, including means for returning the selector to a home condition, in which it is ready for operation again, substantially immediately after the selected line relay has been operated.

3. An electrical communication system according to claim 1, including selector homing means for returning the selector to a home condition, in which it is ready for operation again, and time delay means, responsive to dialing, for causing said selector homing means to return the selector to its home position at a predetermined time after dialing and substantially immediately after the selected line relay has been operated.

4. An electrical communication system according to claim 3, including a plurality of supervisory stations each having a dial as aforesaid, a plurality of communication channels connecting said supervisory stations respectively to said switching station, and means for connecting each supervisory station to the communication channel associated with the line relay selected by operation of the dial of that station, whereby the selector may be operated by the dial associated with any supervisory station as soon as the selector has returned to its home condition and while at least one other supervisory station is in communication with a remote station selected thereby.

5. An electrical communication system according to claim 4, including means associated with each line relay for sending an identification signal from the selected line relay of the switching station to the supervisory station from which said line relay is selected, the identification signals being different for each of the line relays, whereby an indication of the particular line relay selected is provided at that supervisory station.

6. An electrical communication system according to claim 5, wherein said identification signals comprise electrical voltage signals and wherein a check voltmeter is provided at each supervisory station to provide an indication of the voltage signal received, said check voltmeter being calibrated with indicia corresponding to the remote stations.

7. An electrical communication system according to claim 6, including a communication instrument at each supervisory station, means for temporarily connecting said voltage signal, in place of the communication channel associated with the selected relay, for a short period to the communication channel between the switching station and the selecting supervisory station, said check voltmeter being normally connected to the last mentioned channel to read said voltage signal, and means for connecting said communication instrument in place of said check voltmeter at the end of the said short period, whereby said communication instrument is connected to the selected remote station.

8. An electrical communication system according to claim 7, wherein said communication instrument is a meter and each remote station comprises variable electrical means for producing a reading on said meter corresponding to the setting of said variable electrical means.

9. An electrical communication system comprising in combination a plurality of communication channels; a plurality of line relays associated respectively with said channels, each line relay controlling the associated channel and being operable to render said channel operative; a selector operable to operate selectively one of the line relays; at least one supervisory station instrument including a dial for operating the selector, said dial including pulse contacts, normally open operating contacts for connecting the pulse contacts to operate the selector, normally closed holding contacts, and means for closing the operating contacts and opening the holding contacts during dialing; maintaining relay means operable to maintain the selected line relay in operated condition independently of said selector; an operating circuit for said maintaining relay means, said operating circuit including said operating contacts, whereby said maintaining relay means are operated on dialing and consequently the selected line relay is maintained in operated condition independently of the selector; and a holding circuit for said maintaining relay means, said holding contacts being in series in said holding circuit; said holding contacts closing on termination of dialing, whereby said maintaining relay means is maintained in operated condition, and consequently the selected line relay is maintained in operated condition.

10. Electrical communication system control apparatus comprising in combination a plurality of line relays for association respectively with a plurality of communication channels; a selector operable to operate selectively one of said line relays; at least one dial having contacts operable, by dialing, to operate said selector, thereby to operate selectively one of said line relays; and maintaining means for maintaining the selected line relay in operated condition independently of the selector.

11. Electrical communication system control apparatus comprising in combination a plurality of line relays for association respectively with a plurality of communication channels; a selector operable to operate selectively one of said line relays; at least two dials each having pulse forming contacts and each operable, by dialing, to operate said selector, thereby to operate selectively one of said line relays; at least two maintaining means for maintaining the selected line relay in operated condition independently of the selector, the maintaining means being allocated respectively to the dials; and means for releasing the selector for operation by the other dial while said selected line relay is held in operated condition by said maintaining means.

12. Electrical communication system control apparatus according to claim 11, including holding contacts associated with each dial and forming part of said maintaining means allocated thereto, and means responsive to the beginning of dialing of each dial for operating said holding contacts to render inoperative the maintaining means allocated to that dial, whereby the selected line relay operated by one dialing operation of a dial is rendered inoperative by a subsequent dialing operation of that dial.

13. Electrical communication system control apparatus according to claim 12, wherein each said dial comprises a finger plate rotatable from a home position, means for returning said finger plate to its home position, pulse-forming contacts operated during return of the finger plate to its home position, first and second contacts spaced apart, a third contact between said first and second contacts, said third contact being biased into contact with said first contact, cam means rotatable with said finger plate and engaging with said third contact, when the finger plate is in its home position, to hold said third contact in contact with said second contact, said cam means moving out of engagement with said third contact, on movement of the finger plate away from its home position, to permit said third contact to move under its bias into contact with said first contact, said third contact moving out of engagement with said second contact as aforesaid before it contacts as aforesaid the said first contact, said second and third contacts constituting said holding contacts and said first and third contacts constituting switch means connected in series with said pulse-forming contacts, which pulse forming contacts are closed except when operated during dialing to form pulses.

14. Electrical communication system control apparatus according to claim 13, wherein closure of said switch means, by contact between said first and third contacts as aforesaid during dialing initiates operation of said maintaining means.

15. Electrical communication system control apparatus according to claim 14, wherein said maintaining means include auxiliary means for preventing said maintaining means from becoming inoperative during the interval between the breaking of contact between the said second and third contacts and the subsequent making of contact between the said first and third contacts.

16. Electrical communication system control apparatus according to claim 15, wherein said maintaining means include at least one relay and said auxiliary means comprise at least one additional relay.

17. Electrical communication system control apparatus according to claim 16, wherein said additional relay is a slow-releasing relay.

18. An electrical communication system according to claim 9, wherein the said control dial comprises, in combination, a finger plate rotatable from a home position, means for returning said finger plate to its home position, the pulse contacts being operated during return of the finger plate to its home position, first and second contacts spaced apart, a third contact between said first and second contacts, said third contact being biased into contact with said first contact, and cam means rotatable with said finger plate and engaging with said third contact, when the finger plate is in its home position, to hold said third contact in contact with said second contact, said cam means moving out of engagement with said third contact, on movement of the finger plate away from its home position, to permit said third contact to move under its bias into contact with said first contact, said third contact moving out of engagement with said first contact as aforesaid before it contacts as aforesaid the said second contact.

19. An electrical communication system according to claim 9, wherein the said control dial comprises, in combination, a rotatable finger-plate, a series of finger holds on the finger plate around the axis thereof, whereby the finger-plate may be manually rotated by a finger engaging with any selected one of the finger-holds, a finger-stop in the path of such a finger to stop further rotation of the finger-plate by engagement with the finger after the finger-plate has been rotated in a forward direction by an amount predetermined by the finger-hold selected, means resiliently urging the finger-plate to return to a home position relative to the finger-stop by rotation in the reverse direction as soon as the finger is dis-engaged from the finger-hold, governor means for controlling the return movement of the finger-plate so that it takes place at a pre-determined rate, means rotatable with the finger-plate for interrupting a circuit, during the return movement of the finger-plate, a number of times dependent on the finger-hold selected, whereby the dial may be employed to operate a selector to select one of a plurality of contacts thereon in accordance with the finger-hold selected, first and second contacts spaced apart, a third contact between said first and second contacts, said third contact being biased into contact with said first contact, and cam means rotatable with said finger plate and engaging with said third contact, when the finger plate is in its home position, to hold said third contact in contact with said second contact, said cam means moving out of engagement with said third contact, on movement of the finger plate away from its home position, to permit said third contact to move under its bias into contact with said first contact, said third contact moving out of engagement with said second contact as aforesaid before it contacts as aforesaid the said first contact.

20. An electrical communication system control dial according to claim 19, including an additional finger-hold on the finger plate, said additional finger-hold being adjacent said finger-stop when said third contact is in contact with neither said first contact nor said second contact.

21. Electrical communication system control apparatus according to claim 10, including means for returning the selector to a home condition, in which it is ready for operation again, substantially immediately after the selected line relay has been operated.

22. Electrical communication system control apparatus according to claim 10, including selector homing means for returning the selector to a home condition, in which it is ready for operation again, and time delay means, responsive to dialing, for causing said selector homing means to return the selector to its home position at a predetermined time after dialing and substantially immediately after the selected line relay has been operated.

23. Electrical communication system control apparatus according to claim 22, including a plurality of dials as aforesaid situated respectively at supervisory stations of a communication system, and means associated with each line relay for sending an identification signal from the selected line relay to the supervisory station from which said line relay is selected, the identification signals being different for each of the line relays, whereby an indication of the particular line relay selected is provided at that supervisory station.

24. Electrical communication system control apparatus according to claim 23, wherein said identification signals comprise electrical voltage signals and including a check voltmeter at each supervisory station to provide an indication of the voltage signal received, said check voltmeter being calibrated with indicia corresponding to the line relays.

25. Electrical communication system control apparatus according to claim 24, including means for temporarily connecting said voltage signal, in place of the communication channel associated with the selected relay, for a short period to the selecting supervisory station, said check voltmeter being normally connected to read said voltage signal, and means for connecting a communication instrument in place of said check voltmeter at the end of the said short period.

References Cited in the file of this patent

UNITED STATES PATENTS

| | | |
|---|---|---|
| 1,902,187 | Saunders | Mar. 21, 1933 |
| 2,125,093 | White | July 26, 1938 |
| 2,126,208 | Powell | Aug. 9, 1938 |
| 2,206,544 | Davidson | July 2, 1940 |
| 2,249,717 | Thompson | July 15, 1941 |
| 2,328,954 | Conley | Sept. 7, 1943 |
| 2,371,311 | Potts | Mar. 13, 1945 |
| 2,719,960 | Bachelet | Oct. 4, 1955 |